(12) United States Patent (10) Patent No.: US 7,746,019 B2
Hsieh (45) Date of Patent: Jun. 29, 2010

(54) SERVO CONTROL CIRCUIT

(75) Inventor: Hui-Yen Hsieh, HsinChu (TW)

(73) Assignee: Chip Goal Electronics Corporation, Hsin-Chum (TW)

( * ) Notice: Subject to any disclaimer, the term of this patent is extended or adjusted under 35 U.S.C. 154(b) by 316 days.

(21) Appl. No.: 12/026,756

(22) Filed: Feb. 6, 2008

(65) Prior Publication Data

US 2009/0195207 A1 Aug. 6, 2009

(51) Int. Cl.
*G05B 11/32* (2006.01)
(52) U.S. Cl. .................. 318/625; 318/798; 388/907; 388/910
(58) Field of Classification Search .......... 318/625, 318/798, 806, 812; 388/910, 907
See application file for complete search history.

(56) References Cited

U.S. PATENT DOCUMENTS 4,335,321 A * 6/1982 Lyons et al. .............. 327/63
4,858,169 A * 8/1989 Fields ....................... 708/823
4,943,893 A * 7/1990 Shibata et al. ............. 362/37
4,968,896 A * 11/1990 Shibata et al. ............. 307/10.8
5,191,269 A * 3/1993 Carbolante ................ 318/400.23
5,410,456 A * 4/1995 Shibata et al. ............. 362/40
5,546,245 A * 8/1996 Sato ......................... 360/65
6,385,067 B2 * 5/2002 Galbiati et al. ............ 363/132

* cited by examiner

*Primary Examiner*—Rina I Duda
(74) *Attorney, Agent, or Firm*—Tung & Associates

(57) ABSTRACT

The present invention discloses a servo control circuit comprising: a first node for receiving a control voltage; a second node for receiving a feedback voltage; an operational amplifier controlling a current on a path according to the voltages at the first and second nodes, the path including an internal voltage node thereon; an analog to digital converter (ADC) for converting the voltage at the internal voltage node to a digital signal; and a control logic circuit for generating a servo control signal according to the digital signal.

8 Claims, 5 Drawing Sheets

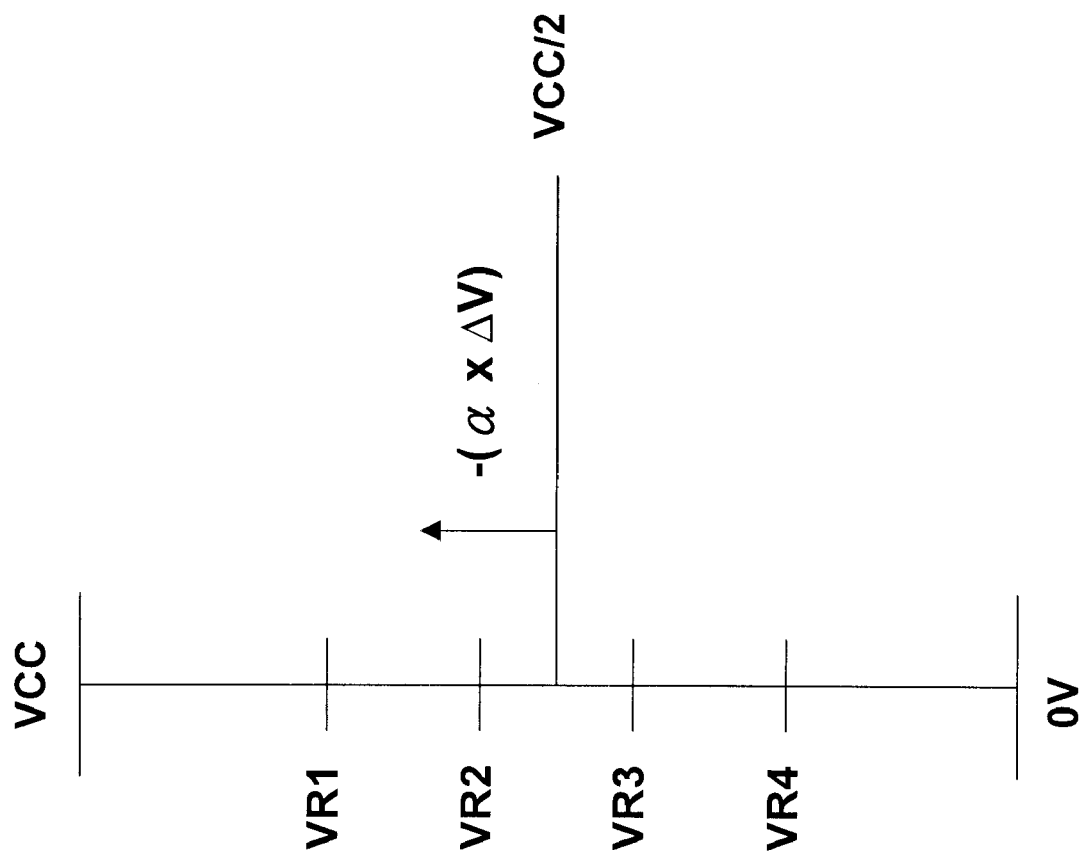

SERVO CONTROL CIRCUIT

FIELD OF INVENTION

The present invention relates to a servo control circuit which can be manufactured by a CMOS manufacturing process.

DESCRIPTION OF RELATED ART

A servo control circuit is a circuit for controlling a servo motor to, e.g., adjust the projection angle of an automobile headlight. FIG. 1 is a schematic circuit diagram showing a typical structure of a conventional servo control circuit 10. As shown in the figure, according to an external control input such as an input from the driver of an automobile, the voltage Vref changes and the difference between the voltage Vref and the feedback voltage Vfb drives the motor 20. In response to the operation of the motor 20, the voltage across the variable resistor at the right side of the motor changes, and the feedback voltage Vfb corresponding to such change is sent back to the servo control circuit 10 for feedback control, so that the motor 20 is stopped when a desired status is reached, such as when an automobile headlight is adjusted to a desired angle.

FIG. 2 shows the circuit details of the conventional servo control circuit 10, in which the relationship between the voltage Vref and the feedback voltage Vfb is reflected at the node B through the setting of the voltage at the node A and the functions of six bipolar transistors B1-B6. The comparators 101-104 determine the voltage level at the node B is, and such information is sent to a control logic circuit 108 to control the motor 20. In the figure, the right side of the dot-dash line is inside the servo control circuit 10, and the left side of the dot-dash line is outside the servo control circuit 10.

The above prior art has the drawback that it employs bipolar transistors, and thus it can not be manufactured by a CMOS manufacturing process.

SUMMARY

In view of the foregoing, it is desirous, and thus an objective of the present invention, to provide a servo control circuit which can be manufactured by a CMOS manufacturing process.

In accordance with the foregoing and other objectives, the present invention proposes a servo control circuit which comprises: a first node for receiving a control voltage; a second node for receiving a feedback voltage; an operational amplifier controlling a current on a path according to the voltages at the first and second nodes, the path including an internal voltage node thereon; an analog to digital converter (ADC) for converting the voltage at the internal voltage node to a digital signal; and a control logic circuit for generating a servo control signal according to the digital signal.

From an aspect of the present invention, the proposed servo control circuit superimposes a first multiple ($\alpha$) of the difference between the control voltage and the feedback voltage ($\Delta V$) to a second multiple ($\beta$) of a supply voltage (VCC), so that the voltage at the internal voltage node becomes $\beta(VCC)-\alpha*\Delta V$. In a preferred embodiment, $\beta=\frac{1}{2}$.

BRIEF DESCRIPTION OF THE DRAWINGS

These and other features, aspects, and advantages of the present invention will become better understood with reference to the following description, appended claims, and accompanying drawings.

FIG. 5 explains the effect of changing the voltage Vref.

DESCRIPTION OF THE PREFERRED EMBODIMENTS

Figure 1:
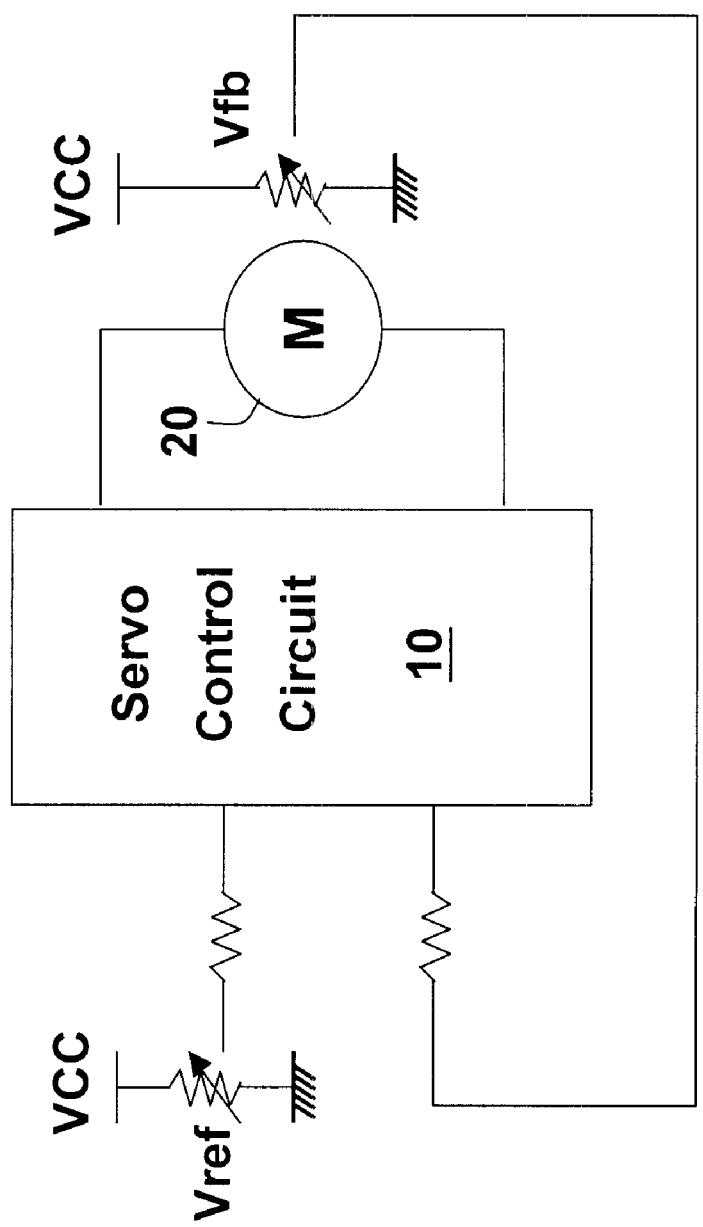
FIG. 1 is a schematic circuit diagram showing how a conventional servo control circuit operates.
Figure 2:
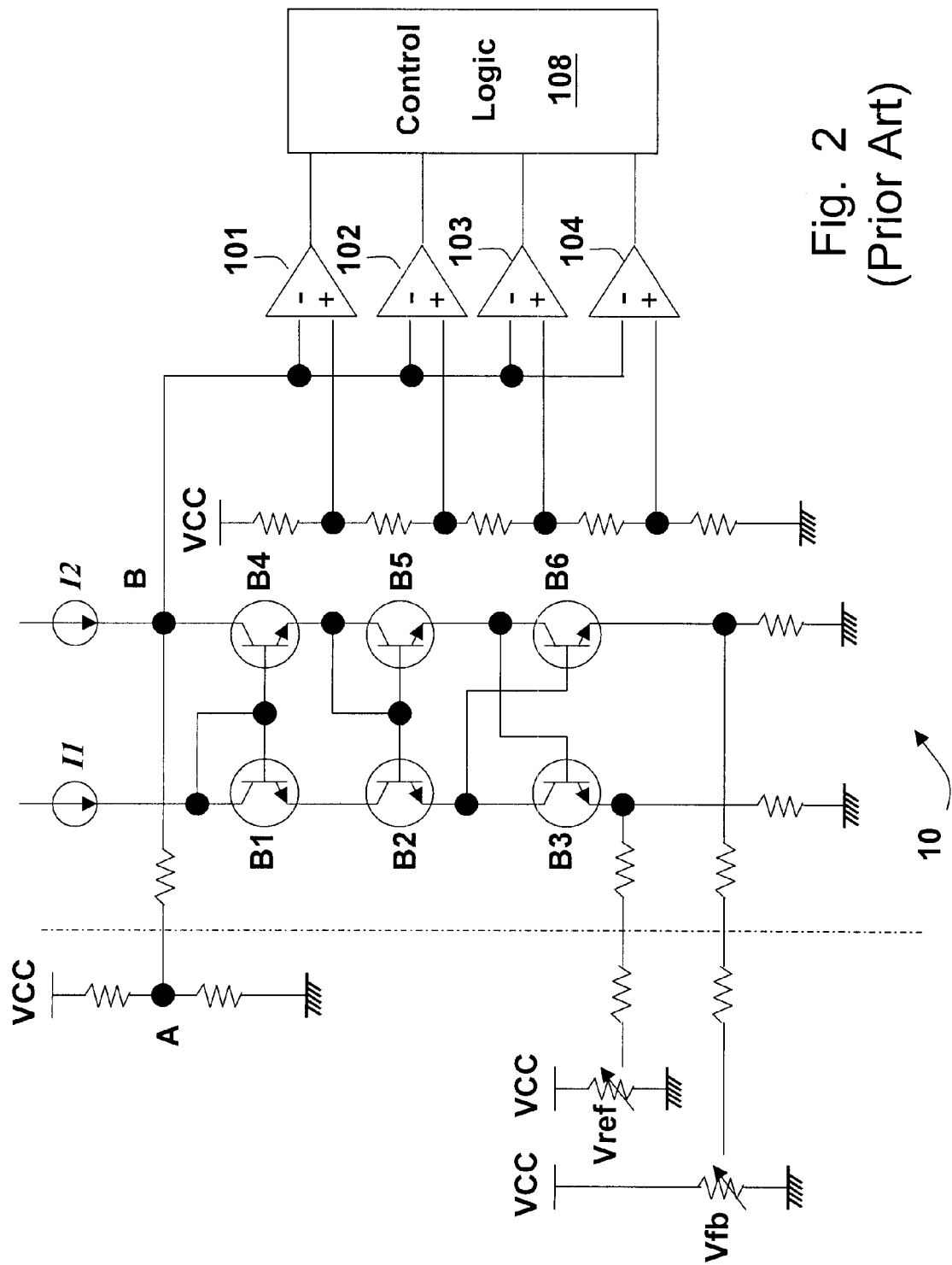
FIG. 2 shows the circuit details of the servo control circuit of FIG. 1.
Figure 3:
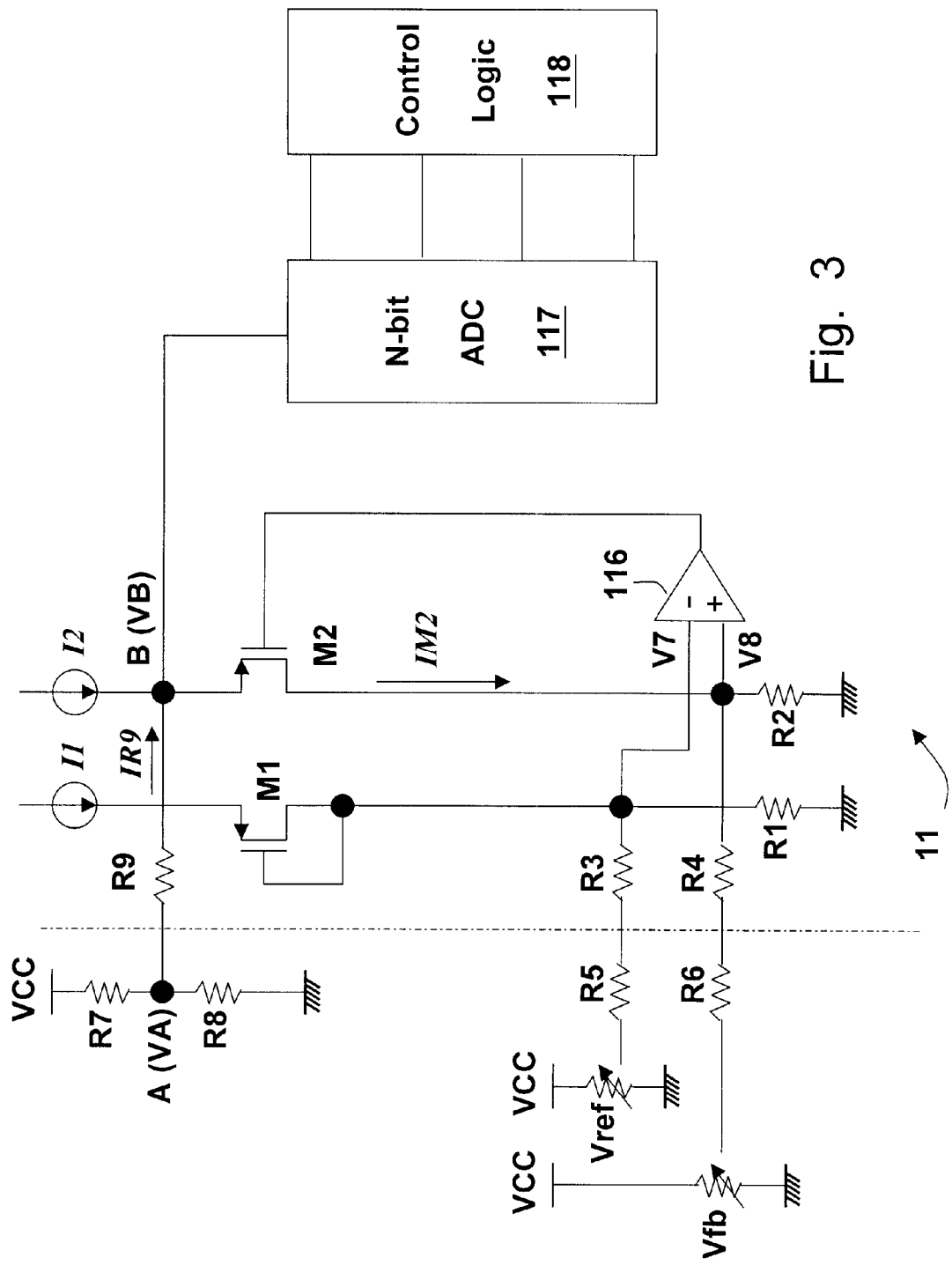
FIG. 3 is a schematic circuit diagram showing an embodiment of the present invention.

Referring to FIG. 3, the servo control circuit 11 of the present invention reflects the relationship between the voltage Vref and the feedback voltage Vfb at the node B through the setting of the voltage at the external reference voltage node A, and the functions of an operational amplifier 116 and MOS transistors M1 and M2. The voltage at the node B is converted to a digital signal by an analog to digital converter 117, and the digital signal is sent to a control logic circuit 118 which generates a servo control signal to control the motor 20 according to the digital signal. In the figure, the right side of the dot-dash line is inside the servo control circuit 11, and the left side of the dot-dash line is outside the servo control circuit 11.

More specifically, when the operational amplifier 116 is at a balanced status, its two inputs should be equal to each other, i.e., V7 (the voltage at the first node)=V8 (the voltage at the second node):

$$V7=[(R3+R5)/(R1+R3+R5)]*(I1*R1)+Vref*[R1/(R1+R3+R5)]$$

$$V8=V7=[(R4+R6)/(R2+R4+R6)]*(IM2*R2)+Vfb*[R2/(R2+R4+R6)]$$

Wherein IM2=I2+IR9.

For simplicity of calculation, the resistances of the resistors and the current amounts of the current sources can be set such that R1=R2; R3=R4; R5=R6; I1=I2; thus, $$IR9=(Vref-Vfb)/(R3+R5)$$

Furthermore, the external reference voltage node A is a node in a voltage divider circuit in connection with the supply voltage VCC. From the current in and currents out from the node A, the following equation can be obtained:

$$[(VCC-VA)/R7]-IR9=VA/R8$$

wherein VA is the voltage at the node A, and thus $$VA=[(R7*R8)/(R7+R8)]*[(VCC/R7)-IR9]$$

By setting R7=R8:

$$VA=(VCC/2)-(R7/2)*IR9$$

And the voltage VB at the node B is thus:

$$VB = VA - R9*IR9$$
$$= (VCC/2) - [(R7/2)+R9]*IR9$$
$$= (VCC/2) - \{[(R7/2)+R9]/(R3+R5)\}*(Vref-Vfb)$$

In the last equation, $\{[(R7/2)+R9]/(R3+R5)\}$ can be taken as a constant $\alpha$, and the equation can be simplified as VB=

$(VCC/2) - \alpha * (Vref - Vfb)$; the meaning of the equation is to multiply the difference $\Delta V$ between the voltage Vref and the feedback Vfb by $(-\alpha)$, and the product is superimposed on the voltage $(VCC/2)$.

Figure 4:
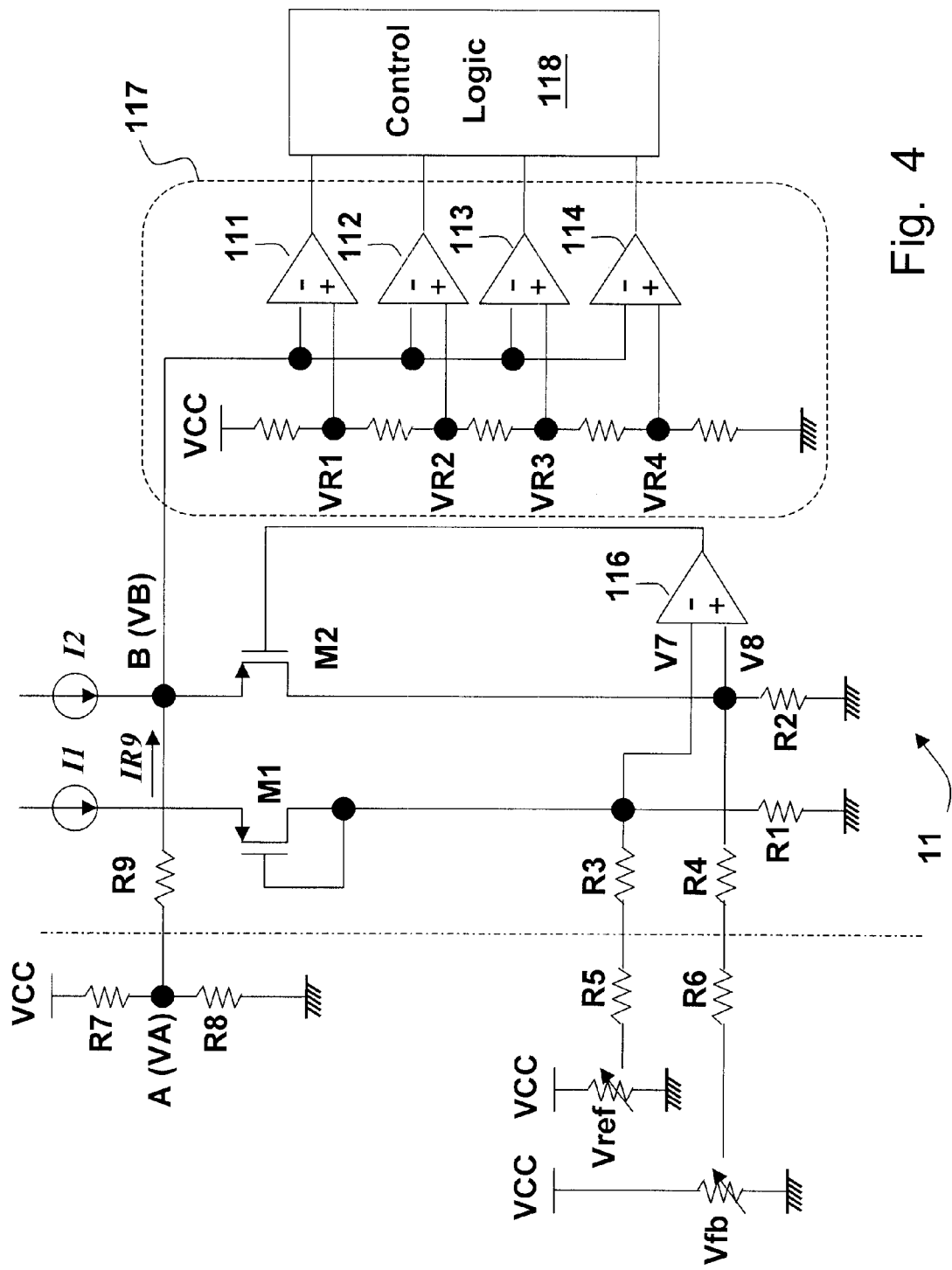
FIG. 4 shows, by way of example, an embodiment of the analog to digital converter.

The voltage VB at the node B is converted to a digital signal by the analog to digital converter 117, and the digital signal is sent to the control logic circuit 118 to control the motor 20. The analog to digital converter 117 need not be a converter of complete levels; it only need be able to distinguish between certain critical levels and convert the signals correspondingly. For example, as shown in FIG. 4, if five levels are provided, the space between every two levels of VCC-VR1-VR2-VR3-VR4-0V does not have to be equal to one another. In one embodiment, the levels may be arranged as thus:

$$VR1 = (VCC/2) + (2\%) * VCC$$

$$VR2 = (VCC/2) + (0.4\%) * VCC$$

$$VR3 = (VCC/2) - (0.4\%) * VCC$$

$$VR4 = (VCC/2) - (2\%) * VCC$$

Of course, other arrangements or other number of levels are also workable.

The meaning of the above arrangement may be better understood with reference to FIG. 5. The voltage VB at the node B is equal to $(VCC/2) - \alpha * \Delta V$, so when $\Delta V = 0$, the voltage VB is balanced at the position of $(VCC/2)$, within the space between VR3 and VR4 in the above arrangement. When, e.g., a driver of an automobile adjusts the voltage Vref, or for some other reason the voltage Vref changes, a difference $\Delta V$ is generated. When a constant multiple $(-\alpha)$ of the difference $\Delta V$, i.e., $(-\alpha) * \Delta V$, increases or decreases to a next level, the analog to digital converter 117 generates a corresponding output, by which the control logic circuit 118 generates a servo control signal to control the motor 20 correspondingly.

The voltage VB need not be balanced at the position of $(VCC/2)$; the balance point can be adjusted by the relationship between R7 and R8. As a more general equation, the voltage VB at the node B is equal to $\beta(VCC) - \alpha * \Delta V$, and $\beta = \frac{1}{2}$ when R7=R8.

The spirit of the present invention has been explained in the foregoing with reference to its preferred embodiments, but it should be noted that the above is only for illustrative purpose, to help those skilled in this art to understand the present invention, and not for limiting the scope of the present invention. Within the same spirit, various modifications and variations can be made by those skilled in this art. For example, the resistances of several resistors are made equal to each other for simplicity of calculation, but they can be arranged otherwise without departing from the spirit of the present invention. The transistors M1 and M2 can be replaced by NMOS transistors, with corresponding modifications (such as the inputs of the operational amplifier 116) to the circuit. The comparators 111-114 may be replaced by a hysteretic comparators. Additional devices may be interposed between any two devices shown in the drawing, without affecting the primary function of the circuit. In view of the foregoing, it is intended that the present invention cover all such modifications and variations, which should interpreted to fall within the scope of the following claims and their equivalents.

What is claimed is:

1. A servo control circuit comprising:
   a first node for receiving a control voltage;
   a second node for receiving a feedback voltage;
   an operational amplifier controlling a current on a path according to the voltages at the first and second nodes, the path including an internal voltage node thereon;
   an analog to digital converter (ADC) for converting the voltage at the internal voltage node to a digital signal;
   a control logic circuit for generating a servo control signal according to the digital signal; and
   a current source electrically connected with the internal voltage node,
   wherein the internal voltage node is electrically connected with an external reference voltage node, and the internal voltage node receives a current from the external reference voltage node and a current from the current source.

2. The servo control circuit of claim 1, wherein the ADC includes a plurality of comparators each comparing the voltage at the internal voltage node with a different voltage reference level.

3. The servo control circuit of claim 2, wherein not all of the spaces between two voltage reference levels are equal to one another.

4. The servo control circuit of claim 2, wherein the comparators are hysteresis comparators.

5. The servo control circuit of claim 1, wherein the servo control circuit receives a supply voltage, and the external reference voltage node is a node in a voltage divider circuit electrically connected with the supply voltage.

6. The servo control circuit of claim 1, wherein the output of the operational amplifier controls a gate of a MOS transistor in the path.

7. A servo control circuit comprising:
   a first node for receiving a control voltage;
   a second node for receiving a feedback voltage;
   an operational amplifier controlling a current on a path according to the voltages at the first and second nodes, the path including an internal voltage node thereon;
   an analog to digital converter (ADC) for converting the voltage at the internal voltage node to a digital signal; and
   a control logic circuit for generating a servo control signal according to the digital signal,
   wherein the servo control circuit receives a supply voltage, and the voltage at the internal voltage node is equal to $\beta(VCC) - \alpha * \Delta V$, where $\Delta V$ is the difference between the control voltage and the feedback voltage, $\alpha$ and $\beta$ are constants, and VCC is the supply voltage.

8. The servo control circuit of claim 7, wherein $\beta = \frac{1}{2}$.

* * * * *